Sept. 2, 1924.  
T. OKAMOTO  
ADJUSTABLE DITCHER FOR CULTIVATORS  
Filed March 9, 1922  
1,506,993
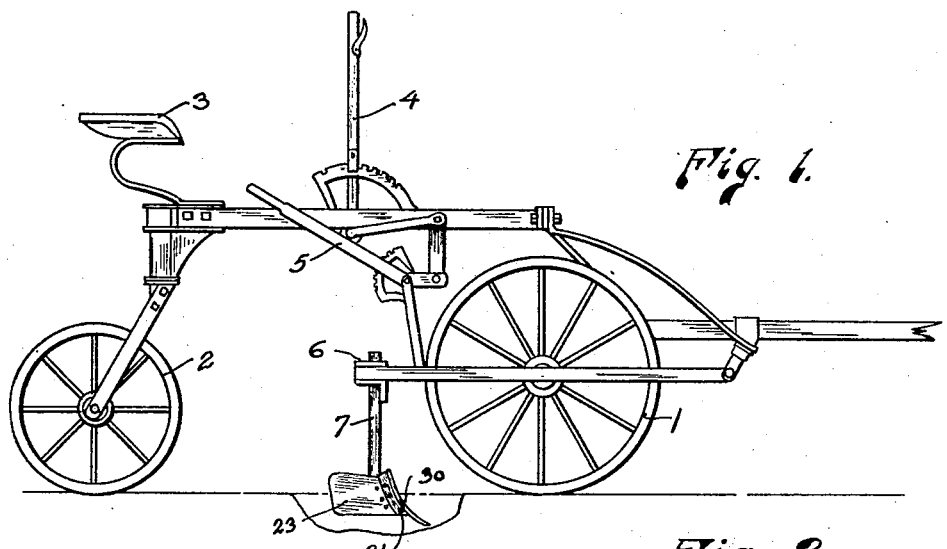
Fig. 1.
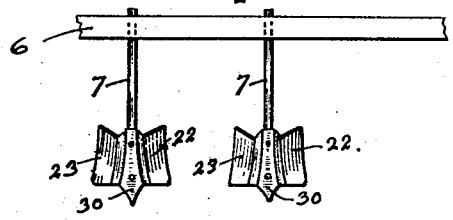
Fig. 2.
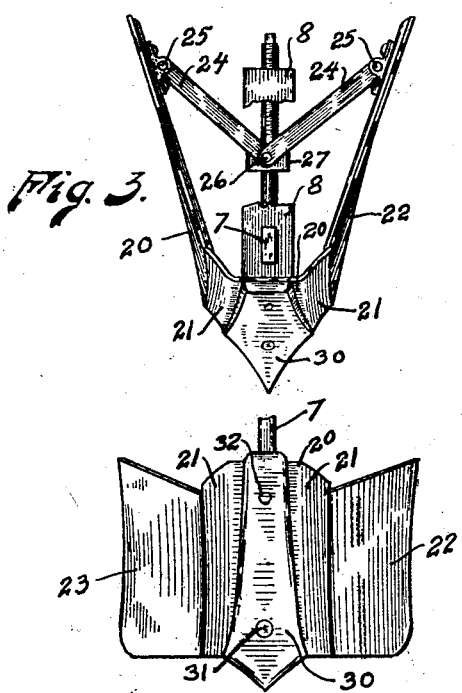
Fig. 3.
Fig. 4.
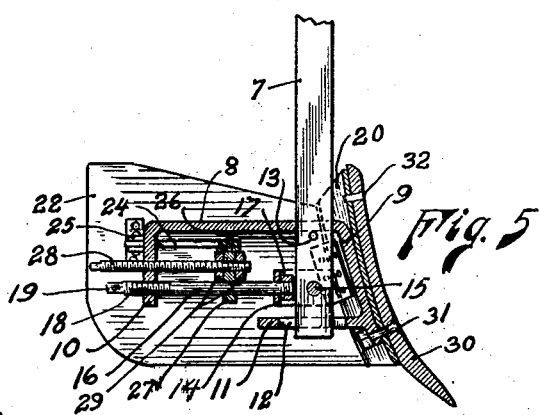
Fig. 5.
Inventor  
Tomotaro Okamoto.
By A. J. O'Brien  
Attorney Patented Sept. 2, 1924.

1,506,993

UNITED STATES PATENT OFFICE.

TOMOTARO OKAMOTO, OF FORT LUPTON, COLORADO.

ADJUSTABLE DITCHER FOR CULTIVATORS.

Application filed March 9, 1922. Serial No. 542,369.

*To all whom it may concern:*

Be it known that I, TOMOTARO OKAMOTO, a subject of the Emperor of Japan, residing at Fort Lupton, county of Weld, and State of Colorado, have invented certain new and useful Improvements in Adjustable Ditchers for Cultivators; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a tool that is adapted for use in connection with cultivators, and has special reference to a tool which can be employed for forming irrigation ditches and for hilling potatoes, beets and similar vegetables.

It is well known that in the cultivation of beets and potatoes, especially in that part of the country where the land is irrigated, it is necessary to form ditches between the rows so that the irrigation water may be led along the rows, and in the case of potatoes it is also necessary to pile considerable ground up and about the vines at a certain time in the crop's growth.

It is the object of this invention to provide a tool that can be attached to the ordinary cultivator and which will enable the operator to form irrigation ditches of the required depth and of any width, and which will be adapted to perform the operation known as "hilling" to which reference has been made.

It is a further object of this invention to produce a tool that can be readily adjusted as to width and depth, and which is so constructed that the point can be quickly and easily removed and replaced.

In order to more clearly describe my invention, I shall have reference to the accompanying drawing in which—

Fig. 1 shows a side elevation of a cultivator equipped with my improved ditcher;

Fig. 2 is a front view showing a pair of ditching tools attached to the cultivator cross bar;

Fig. 3 is a top plan view of my improved tool, with parts thereof broken away to better show the construction thereof;

Fig. 4 is a front elevation of the tool shown in Fig. 3; and

Fig. 5 is a vertical longitudinal section of my improved tool.

The same reference numerals will be used to indicate the same parts throughout the several views.

In Fig. 1, I have shown a cultivator of ordinary construction, provided with a pair of wheels 1, a rear wheel 2, seat 3, adjusting levers 4 and 5, and a transverse bar 6, to which the cultivator tools may be connected. The cultivator may have attached thereto any of the well known tools, but I have merely shown my improved ditching tool connected thereto, as it is with this alone that my invention is concerned.

My improved adjustable ditching tool consists of a vertical bar 7, which is adapted to be secured to the transverse bar 6 in the usual manner. To the lower end of bar 7, I secure my ditching tool in a manner which I will now describe. A bar of rectangular cross section has a substantially straight section 8, the front end 9 thereof being bent downwardly and slightly forwardly in the manner shown in Fig. 5. The rear end 10 is bent downwardly and to the rear of the inclined portion 9; I secure a rearwardly projecting portion 11 which is provided with a slot 12 for the reception of the lower end of bar 7. The horizontal portion 8 has an opening near its front end through which bar 7 extends. A pin 13 passes through a suitable opening in bar 7 and engages the lower side of bar 8 for the purpose of holding the former from being withdrawn upwardly. A U-shaped member 14 has its two sides secured to the bottom of bar 7 by means of a bolt or rivet 15. To the rear side of the U-shaped member I secure a bolt 16 whose head 17 is placed between the bottom, base or the like of the U and the rear side of bar 17. Bolt 16 has a threaded part 18 which has threaded engagement with the downwardly projecting part 10. The end of bolt 16 is made square as indicated at 19, so that it may be engaged by a wrench or with a pair of pliers and rotated. When bolt 16 is turned so as to move it forwardly, the tool will pivot about the point where bar 7 passes through bar 8, and the rear part thereof will be raised; whereas if the bolt turned in the opposite direction, the rear end of the tool will be lowered. Secured to the downwardly and forwardly inclined part 9 by any suitable means, such as rivets, is a plate 20; this plate has its sides 21 bent at an angle in the manner clearly shown in Figs. 3 and 4. Hinged to the rear edges of sides 21 are mold-boards 22 and 23, which serve to throw the ground outwardly to the sides and form a furrow or ditch. In order to hold mold-boards 22 and 23 properly spread, I provide a set of toggles comprising a pair of bars 24 whose outer ends are pivotally connected to the mold-boards by means of pins 25, the inner ends of bars 24 being connected to a common pivot 26, all as shown in Fig. 3. A member 27 is slidably mounted on bolt 16 and carries on its upper edge the pivot pin 26. A bolt 28 passes through member 27 and is freely rotatable therein. On each side of the member 27, bolt 28 is provided with collars 29 which prevent longitudinal movement of bolt 28 while permitting free rotation. Bolt 28 has threaded connection with part 10, and as it is rotated in one direction or the other, it will move the common pivot 26, and either move the mold-boards 22 and 23 closer together or farther apart, the maximum spread being reached when bars 24 form a straight line.

Secured to the front side of plate 20 is a removable point which is held in place by a bolt 31 and a dowel pin 32 in the manner shown in Fig. 5. Point 30 may be removed for sharpening or for replacement without disturbing the other parts of the tool.

In Fig. 2 I have shown two of my ditchers attached to the cross bar 6, but I may attach as many as are needed.

In operating the cultivator, it is my intention to use my ditchers in connection with the ordinary cultivator hoes or bull-tongues, and to arrange my ditchers to the rear whereby the cultivating is first accomplished and then the ditch is made by my improved ditcher.

From the above it will be apparent that I have provided a simple and inexpensive ditching tool which is provided with means which permit the same to be adjusted so as to make it suitable for use with crops that are raised in rows differently spaced. My improved tool has a readily removable point which can be readily replaced when broken or worn out, and which can be removed for sharpening.

Having now described my invention, what I claim as new is—

1. In a device of the class described, a body member comprising a bar having a horizontal central section, a downwardly and forwardly inclined part forming the front end thereof, a downwardly projecting section forming the rear end, a vertical bar pivotally connected to the horizontal section of the first named bar, means secured to the lower end of the vertical bar and co-operatively connected to the rear end of the first named bar for adjusting the relative positions of the same, and a curved plate secured to the downwardly and forwardly inclined part of the first named bar.

2. In a device of the class described, a body member comprising a bar having a horizontal central section, a downwardly and forwardly inclined part forming the front end thereof, a downwardly projecting section forming the rear end, a vertical bar pivotally connected to the horizontal section of the first named bar, a bolt connecting the lower end of said vertical bar and the downwardly projecting part of the first named bar, said bolt having a threaded connection with the latter whereby the rotation of the bolt will serve to tilt the said bars and adjust the relative positions of the same, and a curved plate secured to the downwardly and forwardly inclined portion of the first named bar.

In testimony whereof I affix my signature.

TOMOTARO OKAMOTO.